United States Patent [19]

Le Maigat

[11] Patent Number: 5,765,649

[45] Date of Patent: Jun. 16, 1998

[54] IMPLEMENT FOR LOOSENING SOIL IN AN ENVIRONMENT INCLUDING SUGAR CANE MULCH

[75] Inventor: René Le Maigat, Gosier Guadeloupe, France

[73] Assignee: LM Technologie, Baie-Mahault, France

[21] Appl. No.: 677,429

[22] Filed: Jul. 2, 1996

[51] Int. Cl.$^6$ ................................................ A01B 13/08
[52] U.S. Cl. ........................................ 172/540; 172/196
[58] Field of Search ........................... 56/503, 17.5, 255, 56/DIG. 1; 111/52, 83, 121, 138; 172/166, 169, 196, 439, 540, 699

[56] References Cited

U.S. PATENT DOCUMENTS

| | | | |
|---|---|---|---|
| 1,628,158 | 5/1927 | Krengel . | |
| 3,931,858 | 1/1976 | North | 172/63 |
| 4,267,783 | 5/1981 | Hendrix et al. | 111/52 |
| 4,524,837 | 6/1985 | Harden | 172/196 X |
| 4,548,276 | 10/1985 | Linger | 172/196 X |
| 5,046,346 | 9/1991 | Pegoraro | 172/196 X |
| 5,390,745 | 2/1995 | Harden | 172/196 X |
| 5,437,337 | 8/1995 | Dietrich, Sr. | 172/196 |
| 5,513,486 | 5/1996 | Le Laigat . | |

FOREIGN PATENT DOCUMENTS

| | | |
|---|---|---|
| 608 321 | 7/1926 | France . |
| 1 304 754 | 8/1962 | France . |

*Primary Examiner*—Michael J. Carone
*Assistant Examiner*—Robert Pezzuto
*Attorney, Agent, or Firm*—Oliff & Berridge, PLC

[57] ABSTRACT

An implement includes a toolbar fixed to a three-point hitch of an agricultural tractor. At least two working assemblies are carried by the toolbar, each including a support having two C-shaped claws that are connected at their upper parts to the support, and are joined together at their active lower parts, which are structured to penetrate the soil. A rotary structure is provided for chopping through mulch that accumulates in front of and in the claws. The rotary structure is arranged behind the claws, in their longitudinal mid-plane, so as to describe, about a horizontal transverse shaft, a circular path intersecting a curvature of each claw and, in the working position, extending substantially to ground level.

16 Claims, 6 Drawing Sheets

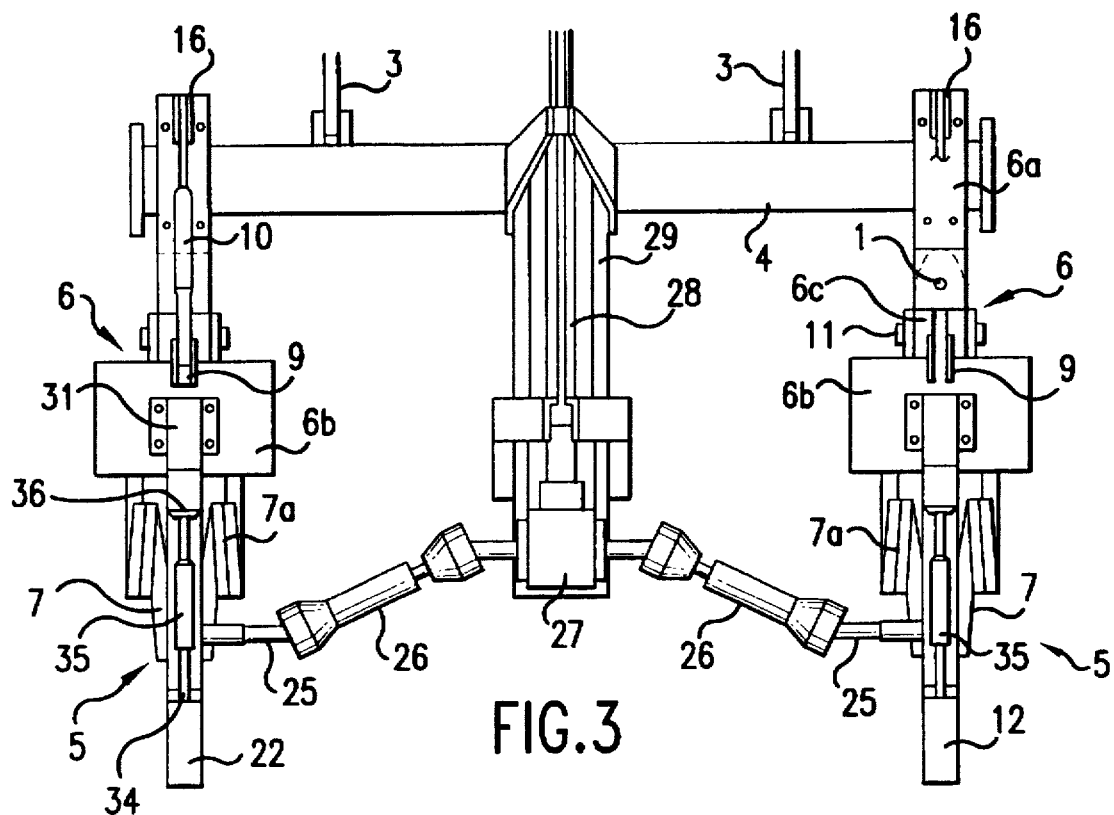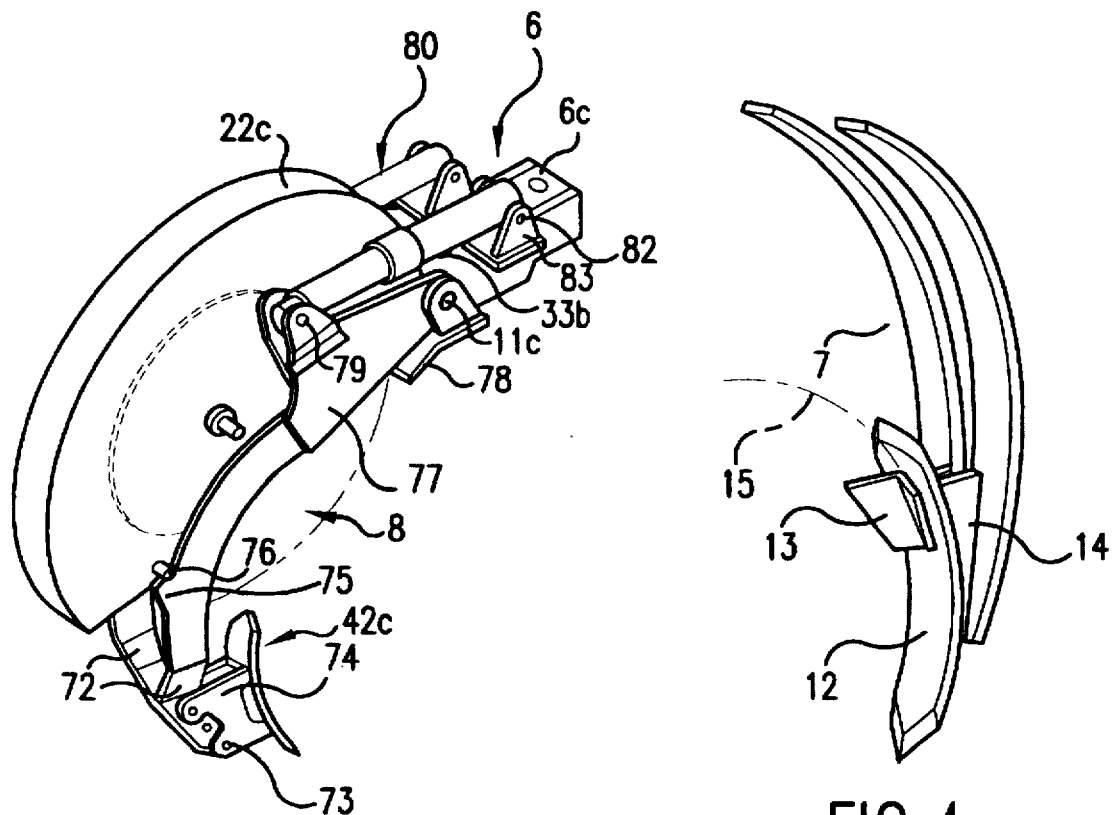

5,765,649

IMPLEMENT FOR LOOSENING SOIL IN AN ENVIRONMENT INCLUDING SUGAR CANE MULCH

BACKGROUND OF THE INVENTION

The invention relates to the technical field of growing sugar cane and targets more specifically agricultural equipment specially designed for working the soil with a view to improving the supply of minerals to crops.

A study on the minerals supplied for sugar cane in, for example, Guadeloupe reveals that: cane with a fifth young shoot does not make efficient use of nitrogen-containing liquid fertilizer as cane with its first young shoot; these canes (and this is an aggravating phenomenon) have access to a more limited soil-supply of nitrogen, probably as a result of unfavorable physical factors influencing the mineralization of nitrogen and the rooting of the plant; and losses of liquid fertilizer by volatilization are high in this type of soil, although such losses can be avoided or attenuated by digging fertilizer into the soil.

This demonstrates the need for the soil to be loosened between rows of sugar cane with young shoots and the advantage in combining loosening with a topical supply of liquid fertilizer localized at a depth of a few centimeters.

Moreover, the advantages of cutting for green soiling and the conserving of continuous mulch including the cane leaves have to be preserved. In order to satisfy this collection of requirements, it is advantageous and sometimes absolutely essential to loosen the soil in the presence of the cane leaves even though these leaves accumulate in front of the tool and make loosening very difficult.

SUMMARY OF THE INVENTION

One object of the present invention is to provide an implement making it possible to loosen the soil in the presence of cane leaves. The implement can include a toolbar fixed to the three-point hitch of an agricultural tractor.

According to one aspect of the present invention, the implement comprises at least two working assemblies carried by a toolbar. Each assembly includes a support carrying two claws formed in the shape of a "C" in the longitudinal and vertical planes, and the claws also define a transverse "V" in which the claws are spaced apart along respective upper parts connected to the support, the claws also being joined together along respective active lower parts configured to penetrate the soil. A cutting device is provided for chopping through mulch that accumulates in front of and in the claws, the rotary structure being arranged behind the claws, in their longitudinal mid-plane, so as to describe, about a horizontal transverse shaft, a circular path intersecting a curvature of each claw and, in the working position, extending substantially to ground level.

When the implement is in the working position with the claws pushed directly into the soil, as the tractor carrying implement moves along and while the claws are loosening the soil, forming a furrow on each side of a row of ridges of sugar canes, the rotary structure cuts up the cane mulch lying on the ground before the mulch can accumulate against the concavity of the claws. The result of this is that the claws are not slowed down in any way, and the claws work under excellent conditions.

In one embodiment of the invention, the implementing may include, to the rear of the lower part of the claws of each working assembly, and in the region of the part of the claws that comes out of the soil, a liquid-fertilizer-distributor shoe connected by a hose to a common tank supported by the toolbar. With this layout, as the claws loosen the soil, liquid fertilizer is dug into the soil close to the foot of the ridges.

In a second aspect of the present invention, there is provided a method for treating soil in an environment including sugar cane mulch. The method includes plowing the soil using a C-shaped claw assembly to create a furrow, the plowing creating a mound of sugar cane mulch substantially aligned with a travelling path of the claw assembly, and dispersing the mound of sugar cane mulch before the claw assembly reaches the mound of sugar cane mulch, thereby preventing accumulation of the mound of sugar cane mulch in the claw assembly.

According to yet another aspect of the present invention, there is provided an implement for loosening soil in an environment including sugar cane mulch, comprising a support, at least one claw member having spaced upper parts connected to the support, said claw member having connected active lower parts structured to penetrate the soil, and a device for dispersing the mulch that accumulates at least one of in front of the claw assembly and in the claw assembly.

BRIEF DESCRIPTION OF THE DRAWINGS

Further features and advantages will become clear from the description which follows with reference to the attached diagrammatic drawings representing, by way of non-limiting examples, preferred embodiments of the implement, wherein:

FIGS. 2 and 3 are elevation views, respectively, from the rear and from above, of the implement of FIG. 1;

FIG. 4 is a partial perspective view of the lower end of a claw of the present invention showing the shape of the moldboard;

FIGS. 10 and 11 are views, respectively, from the side in elevation and in perspective of another embodiment of a working assembly according to the present invention.

DETAILED DESCRIPTION OF PREFERRED EMBODIMENTS

Figure 1:
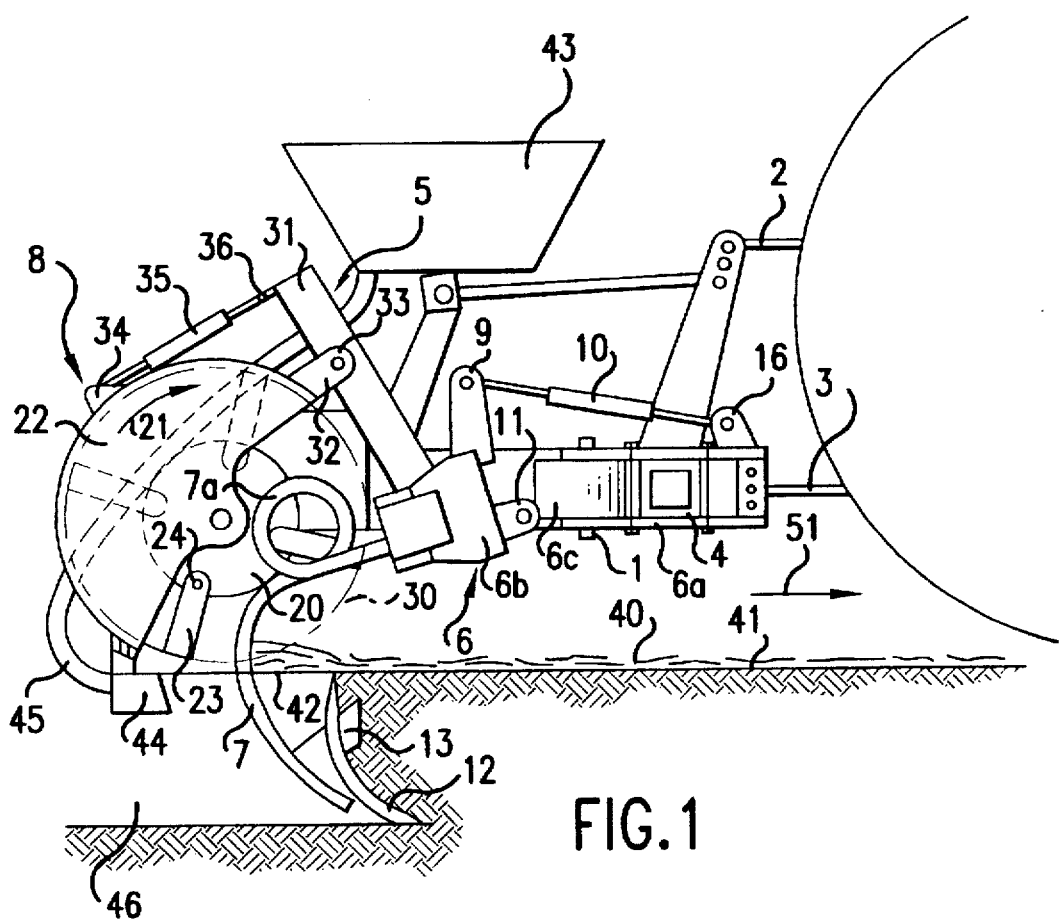
FIG. 1 is a side elevation showing the implement of the present invention in the working position.

In FIG. 1, the numerical references 2 and 3 denote bars of the three-point lift for a tractor to which a transverse toolbar 4 carrying two working assemblies 5 is hitched. Each working assembly 5 includes a support 6 (FIG. 2) carrying, on the one hand, two claws 7 and, on the other hand, means 8 (FIG. 1), e.g., a cutting device, for chopping through mulch.

In the embodiment represented in FIGS. 1 to 6, each of the supports 6 comprises a front part 6a fixed to the toolbar 4 and a rear part 6b carrying the working assembly 5. The connection between the front and rear parts is provided by an intermediate component 6c which is articulated to the front part 6a about a vertical pin 1. The rear part 6b is articulated about a horizontal pin 11 to the intermediate component 6c. The rear part 6b is secured to a vertical lug 9 which is connected, by a mechanical tensioner 10 or a hydraulic ram, to a fastening lug 16 secured to the part 6a. The tensioner 10 or ram constitutes an adjustment means allowing the angular position of the rear part 6b of the support to be altered with respect to the horizontal plane, and therefore the angle at which the claws 7 penetrate the soil to be altered, in order to adapt it to suit the nature of the soil.

As shown in FIGS. 1 to 4, each of the two claws 7 of a working assembly is in the shape of a "C" in the longitudinal vertical plane. Because in this case the claws are cultivator teeth, i.e., the claws include a metal bar that automatically lifts out toward the rear, each tooth is equipped with a coil 7a forming a spring including one or more turns.

Figure 2:
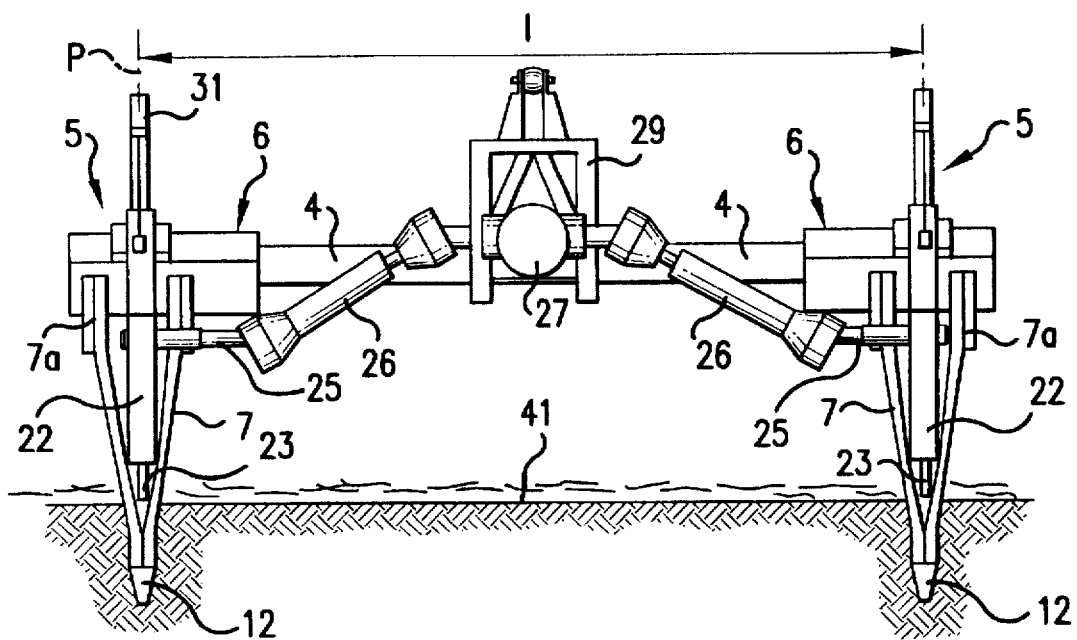
Figure 5:
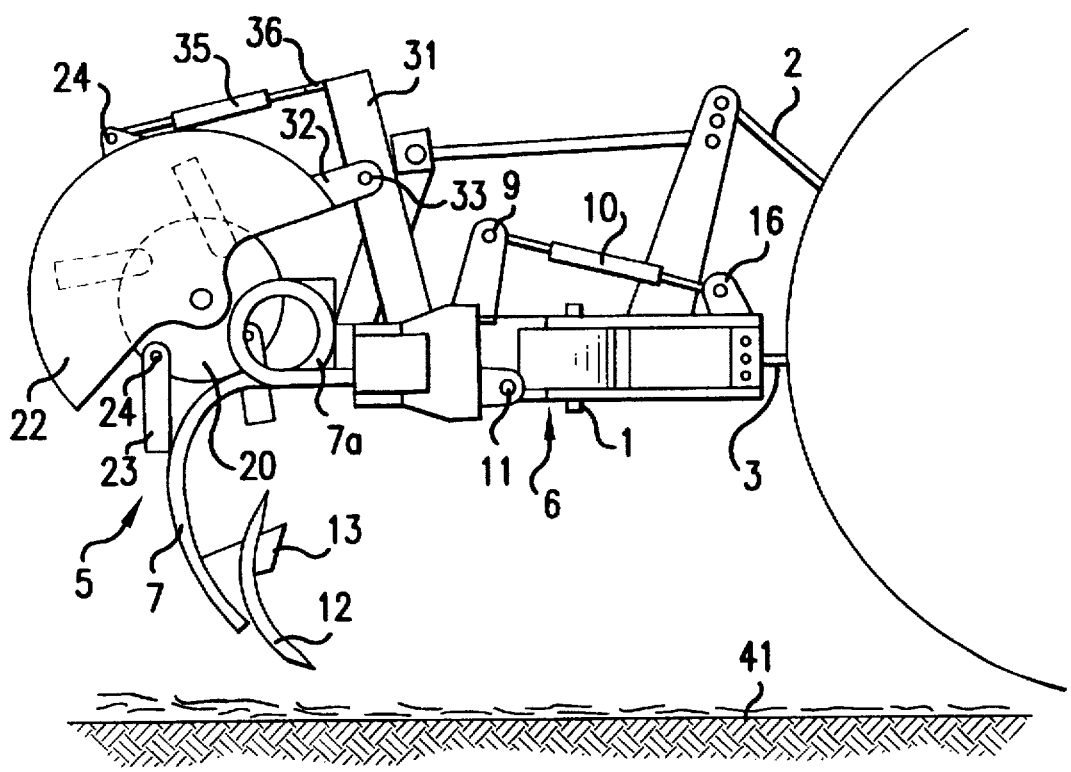
FIGS. 5 and 6 are side elevations similar to FIG. 1 showing, respectively, the implement in the position for transportation, and the implement in a position before penetrating the soil.
Figure 6:
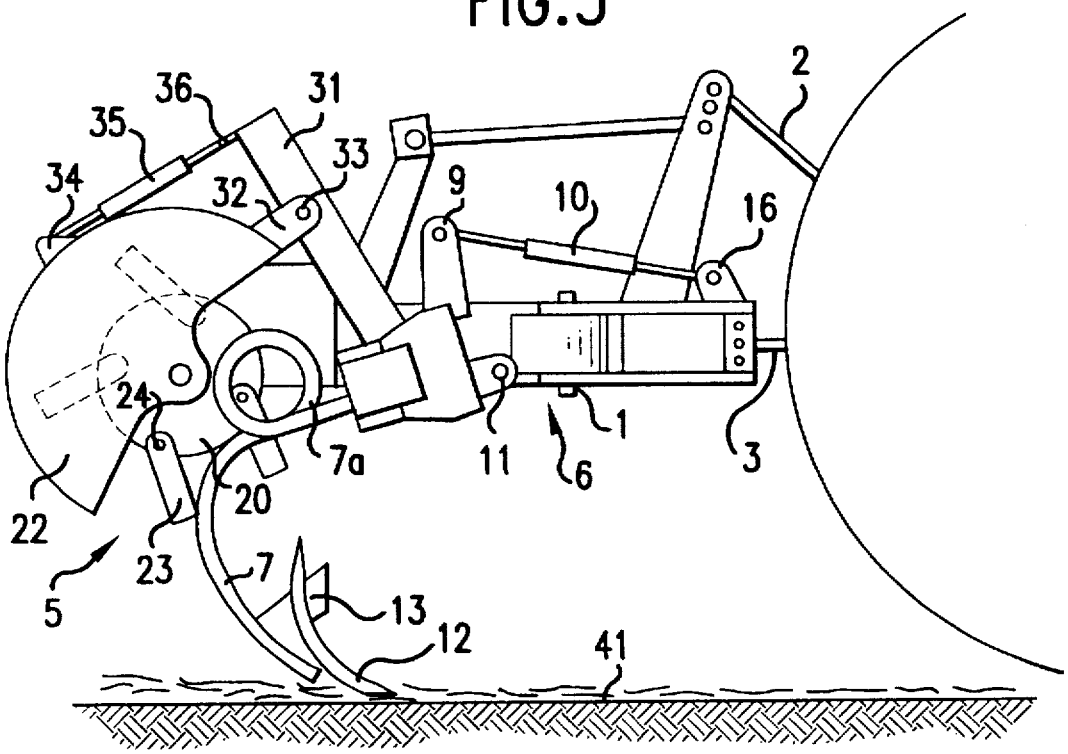

FIG. 2 shows that the two claws of a working assembly form a "V", i.e., the claws are spaced apart at their upper parts connected to the support 6 and are joined together by their lower end forming the active part of the tool. FIG. 4 shows that the active part is equipped with a curved moldboard 12 carrying, projecting forward from its upper end, means for splitting clods including, in the embodiment represented, a "V"-shaped component 13. The curved moldboard 12 need not be fixed directly against the lower end of the claws 7, but may also be fixed by means of a spacer piece 14 of an overall triangular shape so that the lifting-out path of the moldboard, represented by the phantom line 15 in FIG. 4, extends away from the concavity of the claws 7.

This arrangement prevents clods of earth from accumulating in the claws and specifically makes it possible for these clods to be driven to each side of the path of forward travel of the claws.

The means 8 for chopping through the mulch may include a rotary disk 20, mounted so that it can rotate freely in a casing 22. The disk 20 carries radial arms 23 articulated freely to the disk 20 at 24. The disk 20, which may be a circular blade without arms, is secured to a transverse driveshaft 25 (FIG. 2) which is connected to driving means or a motor which drives the disk 20 in rotation in the direction of the arrow 21. In the embodiment described with reference to FIG. 2, the drive means may include Cardan shafts 26 driven by a transmission gearbox 27, which is connected by a PTO shaft 28 to the power take-off of the tractor. The box 27 and the PTO shaft 28 are carried by a central chassis 29 secured to the toolbar 4.

FIGS. 1 to 3 show that, in each working assembly, the chopping means 8 is arranged to the rear of the claws 7 such that their vertical mid-plane P (FIG. 2) lies substantially in the vertical mid-plane of the pair of corresponding claws 7. Thus, the circular path of the arms 23, which are represented in phantom line 30 in FIG. 1, intersects the curvature of the claws 7.

The relative position of each of the chopping means 8 with respect to the claws 7 can be adjusted. In the embodiment represented, the adjustment means (FIG. 1) comprises, on the one hand, a radial lug 32 projecting from the casing 22 and articulated at 33 to an upright 31 of the support 6 and, on the other hand, another radial lug 34 serving to couple the rear end of a tensioner 35, the front end of which is coupled at 36 adjacent an upper end of the upright 31. It is obvious that the tensioner may be replaced by an equivalent means, such as a double-acting hydraulic ram.

When the implement is operating, as shown in FIG. 1, the moldboard 12 carried by the claws 7 penetrates into the soil 40 beneath the mulch 41 and makes a vertical furrow. As the implement moves in the direction of the arrow 51, the earth which builds up against the moldboard is driven upward thus describing a path which comes out at the front. The mulch 41 (arranged transversely to the furrow) tends to build up under the action of the earth thrown out by the moldboard 12, and forms mounds 42 that, when they get close to but ahead of a portion of the claws protruding above the ground, are cut vertically, and in the plane of the furrow, by the radial arms 23 of the chopping means 8. It will moreover be noted that during the loosening operation the path 30 of the chopping means 8 comes very close to the ground, so that the mulch lying on this ground can be efficiently chopped.

Thanks to this layout, when that part of the claws protruding out of the ground encounters the mulch 41, the mulch is chopped and easily moved aside ahead of the moving claws, this preventing the mulch 41 from accumulating in the claws and, in other words, preventing any clogging which would require the operation in progress to be halted in order to unclog the claws. The result of this is that the soil-loosing operation can take place continuously at a speed of about 4 to 6 km/hour.

In an alternative form (not shown) the chopping means includes a circular saw, the outside diameter of which corresponds substantially to the path 30 represented in FIG. 1.

Advantageously, and as shown in FIG. 1, the implement is associated with a liquid-fertilizer distributor comprising a storage tank 43 carried by the chassis 29 and two distributing shoes 44 each arranged to the rear of the chopping means 8, i.e., in the vertical mid-plane and to the rear of the claws 7. Each shoe 44 is connected to the tank 43 by a flexible line 45. While the soil is being loosened, and as shown in FIG. 1, each shoe 44 has no difficulty in penetrating the furrow 46 made by the moldboard 12, and distributes a metered amount of liquid fertilizer directly into the furrow.

Figure 7:
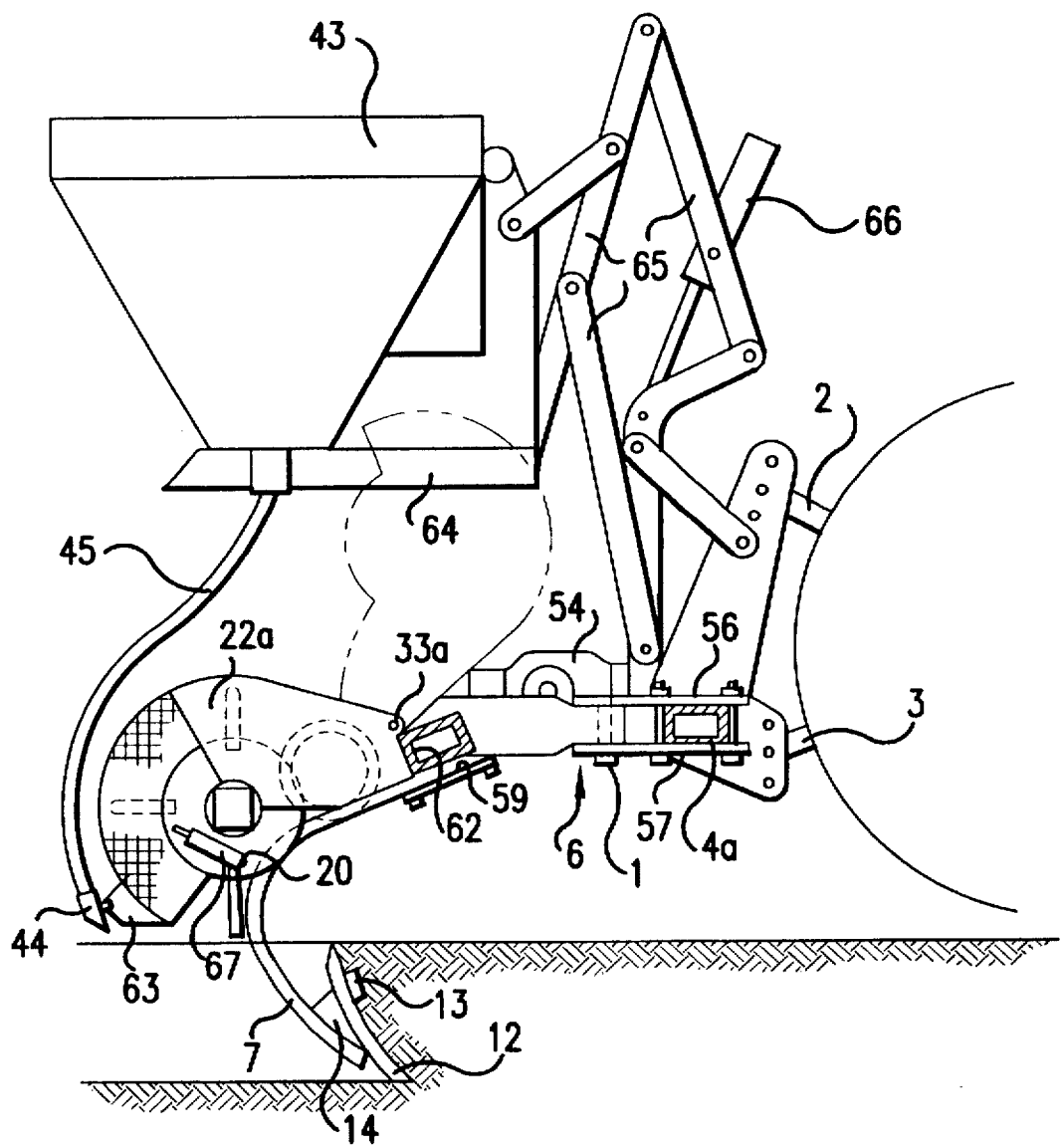
FIGS. 7–9 are elevation views, respectively, from the side, in plan from above, and from the rear of another embodiment of the implement according to the present invention.
Figure 8:
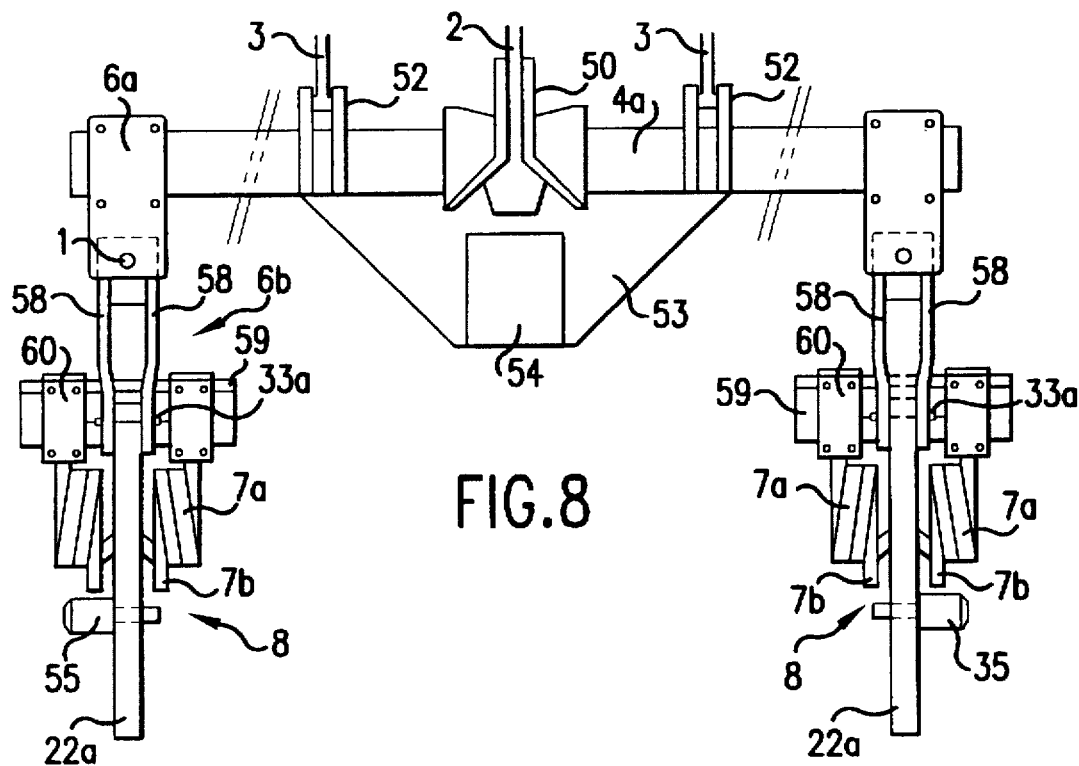
Figure 9:
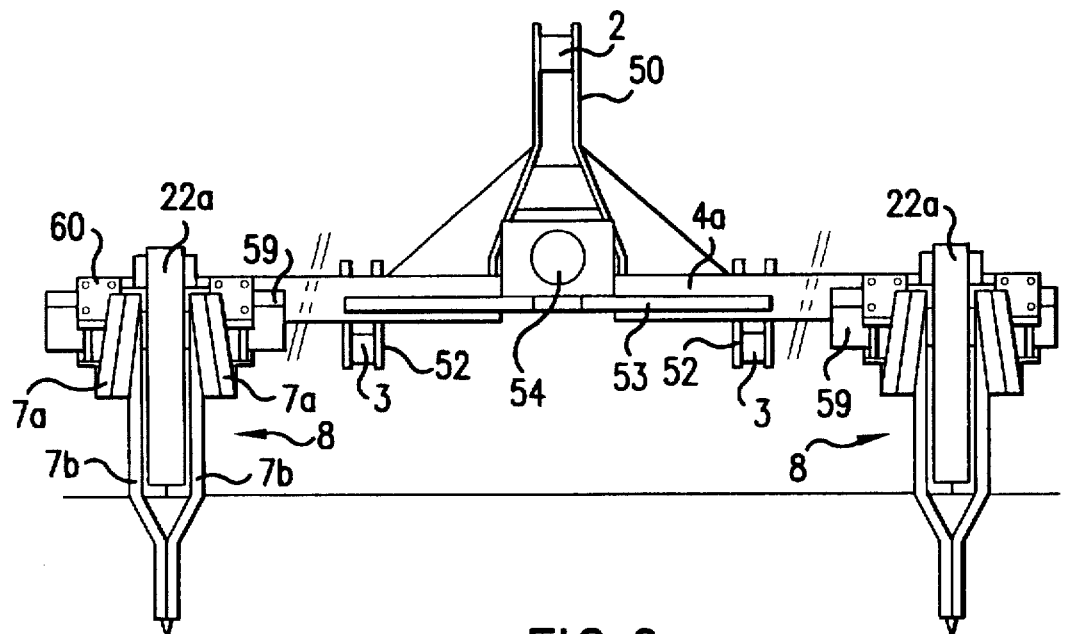

In the embodiment represented in FIGS. 7 to 9, the toolbar 4a is connected to the bars 2 and 3 of the three-point lifting system of the tractor by means of three clevis blocks, namely, a central clevis block 50 and lateral clevis blocks 52. The toolbar 4a is secured to a rear mounting plate 53 carrying at least one hydraulic pump 54 driven by the power take-off of the tractor by a power take-off shaft similar to the PTO shaft 28 of the previous embodiment. The pump 54 is connected by hydraulic lines (not shown) to two hydraulic motors 55 that rotationally drive the chopping means 8 which here include a disk 20 carrying articulated arms or blades 23.

Each working assembly is carried by a support 6 that includes a front part 6a and a rear part 6b (FIG. 8). The front part 6a includes two plates 56, 57 between which the toolbar 4a is clamped, and which extend backward to form bearings for the vertical pin 1 about which the rear part 6b is articulated. The rear part 6b includes two longitudinal arms 58 secured to a crosspiece 59. Fixed to the lateral ends of the crosspiece 5a are the plates 60 which fix the upper end of the corresponding claws 7.

The casing 22a of the chopping means 8 is articulated about a horizontal pin 33a to the two longitudinal arms 58 of the rear part 6b of the support. As shown in FIG. 7, the casing 22a includes an abutment face 62 which, when it is in the working position, comes to rest against the crosspiece 59 of the support. This simple arrangement makes it possible, preferably when stationary, for the claws to be lifted out by raising the entire casing 22a substantially vertical, as shown in phantom in FIG. 7. FIG. 7 also shows that the casing carries, via a lug 63, the liquid-fertilizer distributing shoe 44. The shoe 44 is connected by a hose 45 to the hopper tank 43.

In the embodiment represented, the hopper 43 is carried by a cradle 64 which is itself connected to the toolbar 4a by a lever assembly 65 forming a deformable quadrilateral allowing the hopper to be moved vertically to make it easier to load. The lifting force is provided by a ram 66.

FIG. 9 shows that in this construction the two claws 7 of each working assembly form a "V" only at their lower part and therefore include, beyond their "V"-shaped part, two parallel and vertical branches 7b each of which is extended by the spiral-wound coil 7a giving these claws some degree of elasticity.

Finally, two stops 67 (FIG. 7) which are screw-adjustable, are fixed laterally and on each side of each casing 22a in order to limit the backward movement of the claws 7. Except for these constructional differences, this implement is similar to the one described earlier, fulfills the same functions and gives the same results.

Figure 10:
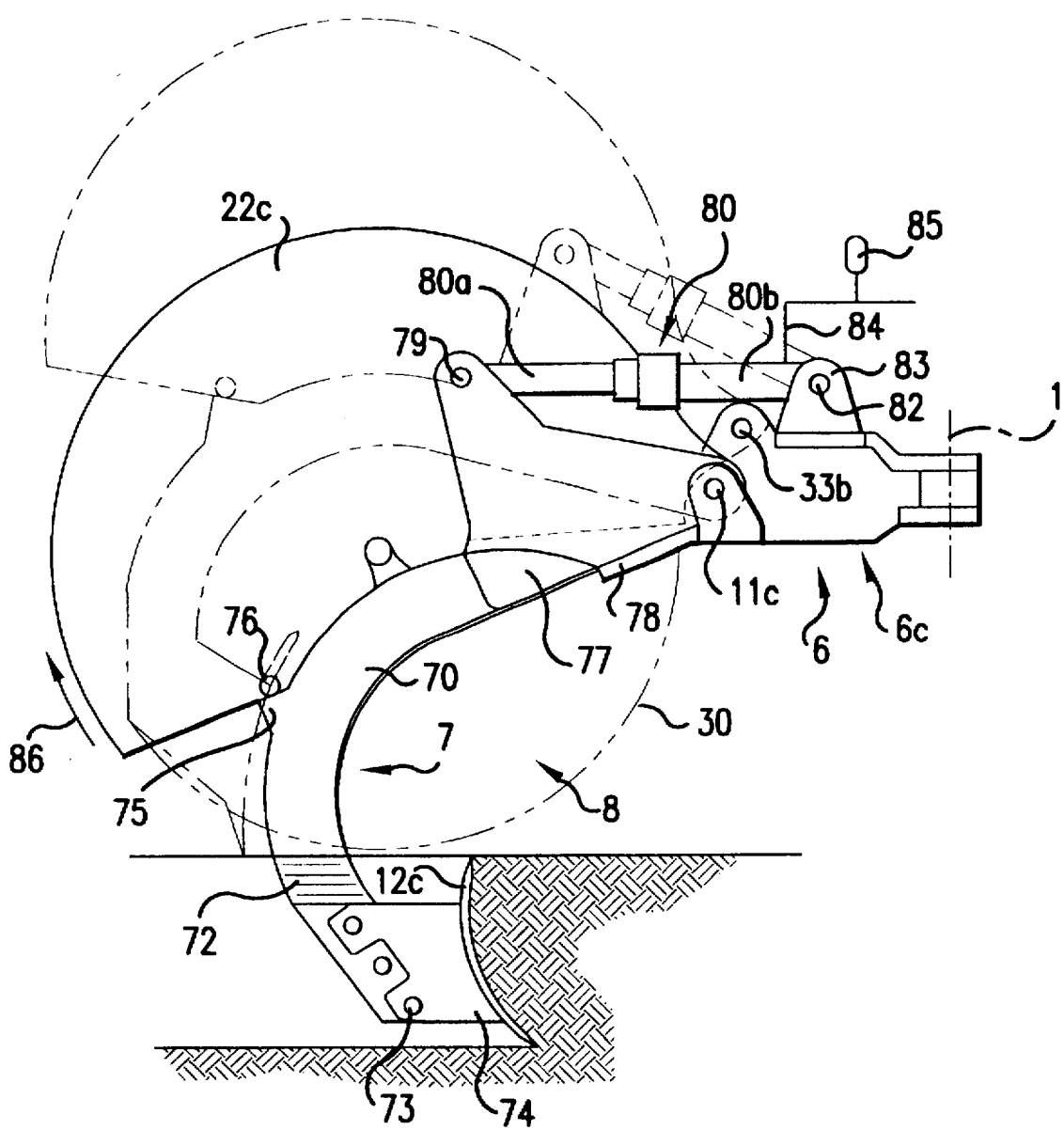

FIGS. 10 and 11 represent another embodiment of the working assembly structured more specifically for working heavy land. The claws 7 include rigid metal blades 70 in the shape of a C in the longitudinal plane. The aerial upper part of the claws 7 is spaced at a distance to allow the casing 22c containing the means for chopping 8 through the mulch to pass. The lower parts of the claws are bent to form a V penetrating the soil and are joined together ahead of the V. A support 74 carrying the moldboard 12c is removably fixed to the lower end of the lower parts by bolts 73. The anterior part of each blade 70 is bevelled or chamfered to form a cutting edge which makes penetration in the soil easier and which can chop through low strength mulch. On their rear parts, the blades 70 each include a projection 75 constituting a resting face for the stops 76 projecting laterally and on each side of the case of the casing 22c. The upper end of each blade 70 is secured to a gusset plate 77 which is articulated about a pin 11c with respect to the central part 6c of the support connected to the transverse toolbar (not shown). The central part 6c includes a transverse rear lug 78 extending below the gusset plates 77 of the two claws of each assembly and limiting the downward tipping of the assembly.

Each gusset plate 77 is also connected, by a transverse articulation pin 79, to the rod 80a of a single-acting hydraulic ram 80, the body 80b of which is articulated at 82 to a clevis block 83 secured to the central part 6c of the support 6. As FIG. 10 shows, the hydraulic supply circuit 84 for the rear chamber of the hydraulic ram 80 includes an oleopneumatic accumulator 85.

The casing 22c carries chopping means 8 substantially identical to that described in the previous embodiments, and the chopping means is articulated about a transverse and horizontal pin 33b with respect to the central part 6c of the support 6.

Thanks to this layout, when the moldboard 12c encounters an obstacle making it very difficult to advance, the claws 7 lift, pivoting backward and vertically upward in the direction of the arrow 86, lifting the moldboard out, and at the same time raising the casing 22c and the chopping means 8, as represented in phantom in FIG. 10, thereby compressing the hydraulic ram 80. The oil driven from the chamber of the ram runs into the accumulator 85, increasing the pressure in the circuit 84. As soon as the obstacle has passed, the accumulator 85, under pressure, drives the excess oil into the chamber of the ram 80, causing the claws 7 and the moldboard 12c, and also the casing 22c resting on the claws, to return to the working position.

It will be noted that by comparison with the previous embodiments, the path 30 of the chopping means 8 penetrates further into the concavity formed by the claws 7 and lies flush with the surface of the ground in order to better chop through the mulch. The V-shaped part 72, lying closer to the two blades constituting the claws, advantageously lies behind the moldboard and in the part going into the ground, so as to reduce the forces in the ground and to form, on each side of the path 30 of the chopping means 8, a passage of uniform width preventing clogging.

Thanks to this implement which, simultaneously, loosens the soil and digs in the liquid fertilizer, the soil is more aerated, retains more water, has better biological activity and allows the root system to develop better. What is more, it makes it possible to obtain a more satisfactory mineral supply to the plant. The combination of these various advantages taken together results in better production of sugar cane.

The invention is not limited to the embodiments of the implement described hereinabove, but also encompasses all alternative forms thereof, irrespective, especially, of the number of assemblies carried by the toolbar and of the means employed to alter the spacing I between the assemblies to adapt them to suit the conditions of treatment for the mulch ridges.

I claim:

1. An implement for loosening soil in an environment including sugar cane mulch, comprising:
   at least two working assemblies affixable to a toolbar fixed to a three-point hitch of an agricultural tractor, each said assembly including a support carrying:
      two claws having spaced upper parts connected to the support, said two claws being joined together at active lower parts thereof which are structured to penetrate the soil, and
      a cutting device for chopping through the mulch that accumulates in front of and in the claws, the cutting device being arranged behind a longitudinal midplane of the claws to define a circular path about a horizontal transverse shaft intersecting a curvature of each claw, the cutting device extending substantially to ground level in a working position.

2. The implement according to claim 1, wherein the support of each working assembly includes a vertical articulation.

3. The implement according to claim 1, wherein the support of each assembly includes a horizontal articulation having an angular orientation with respect to the horizontal defined by an adjustment device interposed between a vertical lug projecting from a rear part of the support and a lug projecting from a front part of the support.

4. The implement according to claim 1, wherein the support of each working assembly includes a front part affixable to the toolbar and a rear part including a crosspiece having lateral ends fixed by plates to upper ends of the claws.

5. The implement according to claim 1, wherein the cutting device includes a circular saw.

6. The implement according to claim 1, wherein the cutting device includes a rotary disk carrying several radial cutting arms articulated to project from a periphery of the disk.

7. The implement according to claim 1, wherein the cutting device is mounted to rotate freely inside a casing adjustably positionable with respect to a corresponding pair of claws.

8. The implement according to claim 7, wherein the casing has a first end secured to a radial lug having a front end articulated to an upright of the support, and a second end secured to a rear radial fastening lug coupled to one end of an adjustment device, another end of the adjustment device being coupled to the upright.

9. The implement according to claim 1, wherein the cutting device is mounted to rotate freely in a casing articulated about a horizontal pin on a rear part of the support, and the cutting device includes an abutment face that rests against a crosspiece of the support in the working position.

10. The implement according to claim 9, wherein the casing, laterally and on each side, carries adjustable stops arranged in a path defined when the claws are lifted from the soil.

11. The implement according to claim 1, wherein each of the claws includes a cultivator tooth comprising a steel bar including a spiral-wound coil allowing each said claw to move back elastically in the event of overload.

12. The implement according to claim 1, wherein each of the claws includes a rigid metal blade having a lower end removably fixed to a support carrying a moldboard and an upper end fixed to a gusset plate, the gusset plate being articulated about a horizontal pin with respect to the support and being connected by an articulation to a rod of a single-acting hydraulic ram having a body articulated to the support and a supply circuit including an accumulator.

13. The implement according to claim 12, wherein each rigid blade is positioned by means of a corresponding gusset plate resting on a transverse rear lug secured to the support and has a projection defining a resting face for a stop of a casing of the cutting device, the casing being articulated about a horizontal pin with respect to the support.

14. The implement according to claim 1, wherein the claws of each assembly include lower ends having a curved moldboard connected to one of a spacer piece and a support, thus keeping a lift-out path of the moldboard away from a concavity of the claws.

15. The implement according to claim 14, wherein the moldboard includes means for splitting mulch clods projecting forward from an upper end of the moldboard.

16. The implement according to claim 1, further comprising a liquid-fertilizer-distributor shoe connected by a hose to a common central tank, the shoe being positioned to a rear of a lower part of the claws of each working assembly and in a region of the claws above the ground.

* * * * *